Patented Aug. 22, 1950

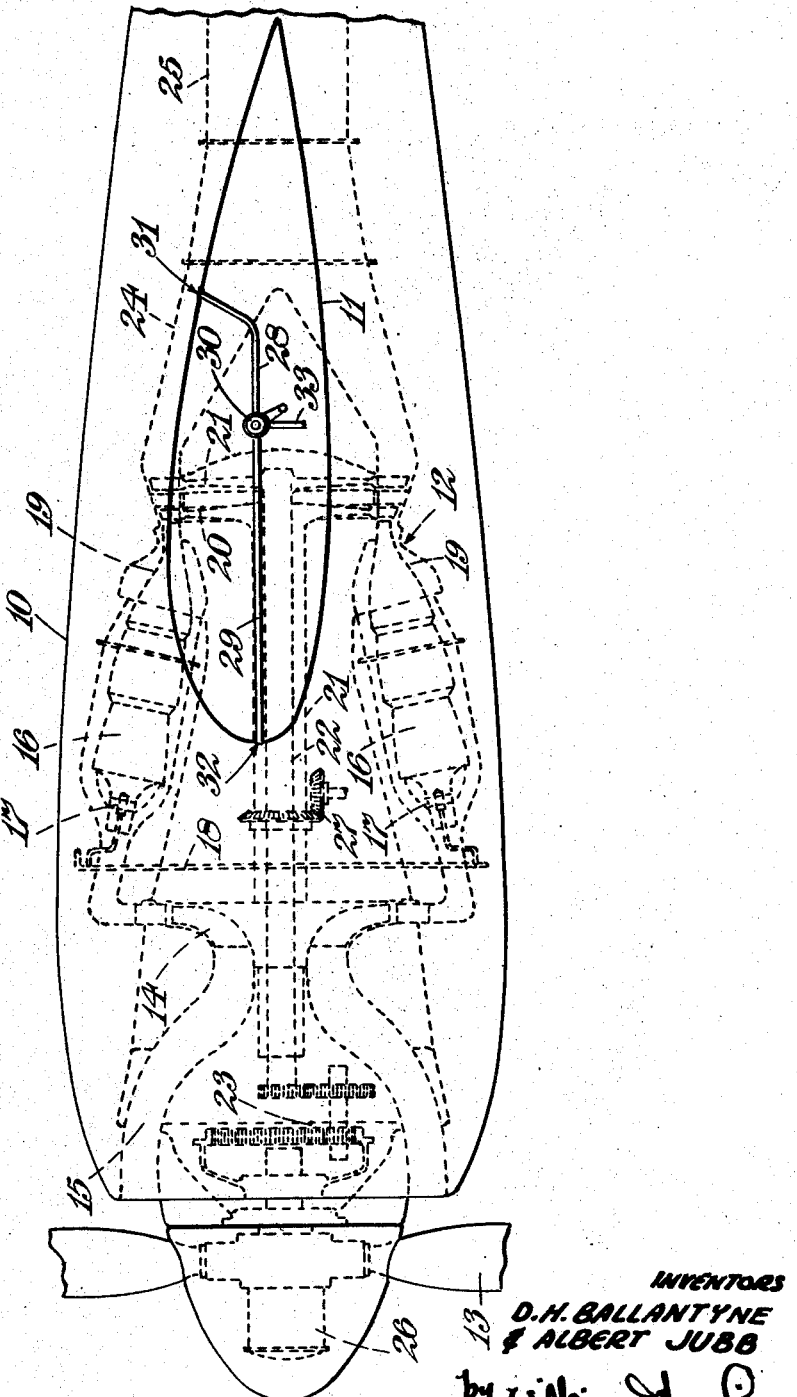

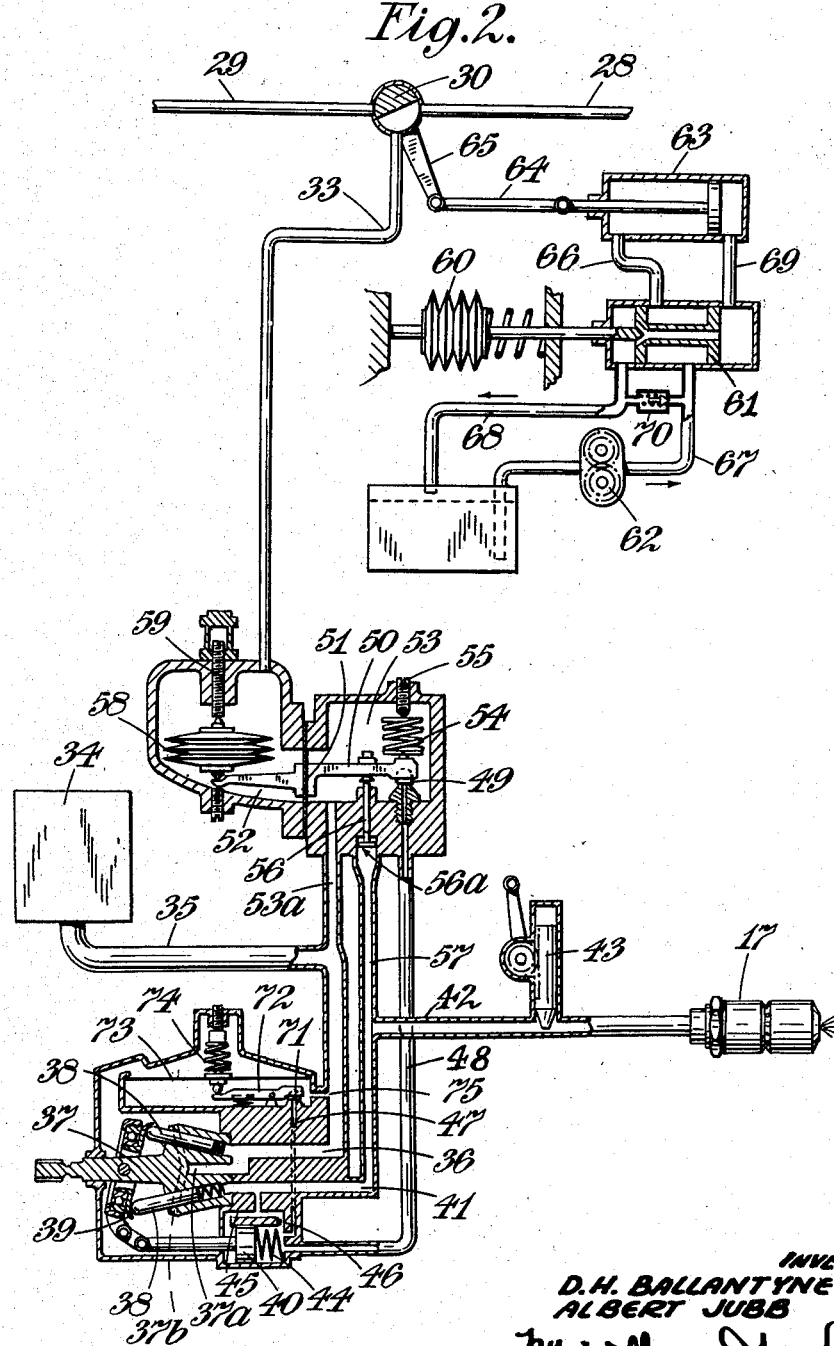

2,519,624

UNITED STATES PATENT OFFICE 2,519,624

FUEL CONTROL SYSTEM FOR AIRCRAFT GAS-TURBINE POWER PLANTS

David Havelock Ballantyne, Littleover, and Albert Jubb, Buttersaw, Bradford, England, assignors to Rolls-Royce Limited, Derby, England, a British company Application December 29, 1948, Serial No. 67,952
In Great Britain January 5, 1948

3 Claims. (Cl. 244—53)

This invention relates to fuel control systems for aircraft gas-turbine power-plants, and is concerned more particularly with a problem which arises in connection with gas-turbine engines installed in aircraft capable of a high forward speed and in which the engine compressor is supercharged by the dynamic pressure, that is the pressure arising as a result of the forward speed.

Since the total pressure represented by the sum of static and dynamic pressure is applied with a relatively small loss to the intake of the compressor, the supercharging effect of the dynamic pressure increases the mass flow through the compressor and as a result, although the power absorbed by the compressor increases, the power available for propulsion purposes is also increased. In the case of a pure gas-turbine jet propulsion engine the increased power is available as an increased thrust from the jet and in the case of a power plant comprising an airscrew or ducted fan driven by the gas-turbine engine, the increased power is available as an increased thrust developed by the airscrew or ducted fan. This increase in power may, with known control arrangements, be so great that the engine actually develops a power considerably in excess of its designed power for which the engine can be ground tested, thus giving rise to dangerous operating conditions.

The increase in power due to supercharging by dynamic pressure is most marked in the case of power-plants in which the engine drives an airscrew or ducted fan. For instance, assuming for a power-plant of this type with known controls that the shaft horse-power available at the take-off of the aircraft to be represented by "100% designed take-off power," it can be shown that at true air speeds of 500 miles per hour at ground level, a shaft horse-power may be developed which can be represented by "140% designed take-off power." Such an increase in the available shaft horse-power which is attributable to the supercharging effect above referred to may give rise to conditions in the running of the engine which cannot be fully tested on a static test rig and may therefore cause failure of the engine.

In aircraft gas-turbine power-plants as hitherto used, it has been the practise to provide a fuel control which is responsive to the sum of the ambient static pressure and of the dynamic pressure arising as a result of the forward speed. The sum is referred to as the "total pressure" and the total pressure has been applied to the barometric capsule device arranged to control the fuel supply primarily to vary the fuel supply to the engine in accordance with changes in the fuel consumption due to changes of altitude and of forward speed, thereby to maintain, in the case of a pure jet propulsion engine, substantially constant rotational speed of the engine compressor-turbine rotor assembly, and, in the case of an engine driving an airscrew or ducted fan, to maintain an approximately constant temperature in the combustion equipment of the engine. Such a fuel control may result in the available power being substantially in excess of that for which the engine was designed and was ground-tested.

The present invention has for an object to provide an improved fuel-supply control system in which this difficulty is avoided.

According to the present invention, there is provided for an aircraft gas-turbine power-plant, a fuel-supply control system comprising a pressure-responsive device which is arranged to be subjected to a pressure derived from a point on the aircraft so selected that under flight conditions the value of said pressure is less than the ambient static pressure and decreases with increase of forward speed and which is also arranged to reduce the fuel supply with reduction of such pressure. In this manner, at any given altitude, the pressure-responsive device is actuated by a pressure which decreases progressively with increase of forward speed of the aircraft, and therefore the pressure-responsive device acts at each instant to control the fuel-supply as for an altitude which is represented by a static pressure equal to the actual pressure acting on the pressure-responsive device, i. e., for an altitude which is greater than that at which the aircraft is flying. As a result for a given setting of a control, say a manually-operated throttle, the fuel supply is decreased progressively with increase of flight speed and an unacceptable increase of the power delivered by the engine at maximum power setting of the control is avoided.

According to a feature of this invention there may be provided an arrangement whereby according to the aircraft altitude the pressure-responsive device is selectively subjected to the pressure at one of a number of points on the aircraft, at one at least of which points the pressure under flight conditions is less than the ambient atmospheric pressure and decreases with increase of forward speed and at a second of which points the pressure increases with forward speed. The second of said pressures may be rendered effective on the pressure-responsive device at an altitude at which, owing to the reduction of air density, the engine, with maximum power setting of the control, is incapable of developing a power output in excess of the designed power output. Conveniently such alternative pressure points may be connected with a chamber containing the pressure-responsive device under control of valve means actuated by a barometric element subject to the ambient static pressure and arranged to effect the change-over of the pressure supply to the chamber from one point to the other at a predetermined altitude or over a predetermined range of altitude.

The pressure point at which the pressure reduces with increase of aircraft speed may be at any suitable point on the aircraft, such points existing for instance on the upper surface of an aerofoil or on the nacelle cowling of the engine.

According to another feature of this invention, to be used in combination with the above-mentioned feature, there may be provided in a fuel-supply control system as above set forth relief or like valve means effective to limit the maximum fuel supply to the engine when the fuel control lever is set for maximum power. The relief or equivalent valve means may be set to give a maximum fuel pressure appropriate to give the maximum power output under stationary ground-running conditions, and under normal atmospheric temperature and pressure conditions. The provision of such valve means will avoid the supply to the engine of an excessive quantity of fuel under stationary ground-running conditions and under low temperature atmospheric conditions such as those which are experienced in arctic climates. The pressure-responsive device previously mentioned and the relief or equivalent means may be combined in a single control unit for the fuel supply.

The invention has its most important application to aircraft gas-turbine engines driving an airscrew or ducted fan. Hitherto a variable datum constant speed governor has been used to maintain a predetermined rotational speed of the airscrew, and the fuel supply has been controlled by a pressure-responsive device subjected to total pressure. In one such known fuel control arrangement, there was provided a variable delivery pump of the kind having a swash plate or cam, the angular setting of which was determined by means of a servo piston and cylinder device. The position of the servo piston within the cylinder was controlled by means of a bleed valve from the servo cylinder, which valve was operated in accordance with the loading of a barometric capsule. The capsule in such a known system was subjected to total pressure, i. e. the sum of ambient static pressure and dynamic pressure arising from forward speed. With such an arrangement at high air-speed and at low altitude, an excessive shaft horse-power could be developed and transmitted to the airscrew, giving rise to dangerous running conditions.

According to yet another feature of this invention therefore a control arrangement otherwise similar to the known arrangement described above has a pressure applied to the barometric control capsule which pressure is derived from a point on the aircraft located so that under flight conditions this pressure is less than the ambient static pressure and progressively decreases with increase of flight speed. It will be appreciated that the barometric capsule will also still remain sensitive to changes of the ambient static pressure, due for instance to changes of altitude so that the fuel supply will be compensated for changes of altitude to reduce the fuel supply with increase of altitude.

In one known form of barometric capsule mechanism for controlling a bleed valve in a servo system, the capsule operates the bleed valve by loading a rocking arm, which is also so loaded by a piston and cylinder device in accordance with the fuel delivery pressure so that when the fuel pressure reaches a predetermined value, the bleed valve is opened to reduce the stroke of the pump and thereby to reduce the fuel delivery pressure. Such an arrangement operates in effect as a relief valve. Further, the known system includes a centrifugal governor device driven by the engine, limiting the fuel to avoid overspeeding of the engine rotor. With such an arrangement low air intake temperatures, such as those experienced under arctic conditions, may result in an excessive power delivery, the fuel flow merely being limited by the centrifugal governor sensitive to rotational speed.

It is preferably arranged in accordance with a subsidiary feature of the present invention that the bleed valve be arranged to function at ground level and under static aircraft conditions to limit the fuel flow to a value appropriate to give the designed and bench-test power, or an acceptable value in excess thereof. With such an arrangement the fuel supply to the engine under low temperature air intake conditions will be limited by the maximum fuel pressure available, as defined by the relief valve, and not by the centrifugal governor.

One fuel-supply control system arrangement of this invention will now be described with reference to the accompanying drawings in which:

Figure 1 illustrates diagrammatically a gas-turbine engine power-plant installed in a nacelle in the wing of an aircraft, and Figure 2 illustrates diagrammatically a fuel control system for the gas-turbine engine.

Referring to Figure 1, there is illustrated diagrammatically a nacelle 10 which is supported in a wing 11 of an aircraft, housing a gas-turbine engine generally indicated by reference numeral 12, the engine being arranged to drive a variable-pitch airscrew 13 mounted at the forward end of the engine.

The gas-turbine engine comprises a compressor 14 having a forwardly facing air-intake 15 and arranged to deliver compressed air into a ring of combustion chambers 16 to which fuel is supplied by fuel injection devices 17 through a supply manifold 18. The fuel is burnt in the air flowing through the combustion chambers 16 and is delivered by way of nozzles 19 into a two-stage turbine of which one rotor 20 is drivingly connected by a hollow shaft 21 to the compressor 14 to drive it and of which the other rotor 21 is connected by a shaft 22 nested within the hollow shaft 21 through a reduction gear 23 to the airscrew 13 to drive it. The exhaust from the two-stage turbine is carried rearwardly through an exhaust unit 24 into a jet pipe 25 which delivers the exhaust gases rearwardly from nacelle 10 and thereby to assist in propulsion of the aircraft.

The airscrew is provided with a variable datum constant speed governor with pitch changing mechanism indicated at 26. The governor and pitch changing mechanism may be of any known or convenient form, the purpose of these being to vary the pitch of the airscrew blades and maintain the rotational speed of the airscrew constant in accordance with the datum setting of the governor.

A drive take-off 27 is provided from the compressor shaft 21, the purpose of this drive being mentioned below.

Within the wing 11 there are provided a pair of conduits 28, 29 leading from a valve 30 respectively to a point 31 at which, in flight of the aircraft, the static pressure is below the ambient atmospheric pressure and decreases with increase of the forward speed of the aircraft and to a point 32 at which the pressure increases with forward speed. The valve 30 is controlled in a manner described below to connect one or other of the conduits 28, 29, to a delivery conduit, 33.

Referring now to Figure 2, there is illustrated the fuel-supply system and control for the fuel injection devices 17 above referred to. In this figure only one of the fuel injection devices is illustrated but the same fuel system is employed, to supply fuel to a plurality of the fuel injection devices 17.

The fuel supply means comprises a fuel reservoir 34 from which fuel is drawn off by a pipeline 35 to the inlet 36 of a variable-delivery swash-plate pump of known kind. The rotor 37 of the pump is driven from the drive take-off 27 and is provided with a plurality of plungers 38 which are reciprocated within bores of the rotor 37 under control of swash-plate 39, the angle of inclination of which is controlled by a servo piston and cylinder device 40. The plungers during rotation of the rotor 37 alternately suck in fuel from the pump inlet 36 and deliver the fuel into the fuel outlet 41, from which the fuel flows through a pipeline 42 past a manual throttle 43 to the fuel injection devices 17.

The servo piston is arranged to be controlled as to its position by a spring 44 and by the fuel delivery pressure which is arranged to act on one side of the piston against the action of spring 44 through a duct 45 and on the other side of the piston through a restricted orifice 46. The servo fluid is arranged to be bled off from the spring-loaded side of the piston through a pair of valve-controlled ducts 47, 48.

With the flow through the valve control ducts 47, 48 cut off the fluid pressure on each side of the piston of the device 40 will be the same, so that the spring will urge the piston to the left (as viewed in the figure) moving the swash-plate 39 to a position corresponding to the full stroke of the pump. If, however, a flow occurs through one or other of the ducts 47, 48 the pressure on the spring-loaded side of the piston falls and the piston will be moved to the right as viewed in the drawing thereby reducing the stroke of the pump.

The outlet from the duct 48 is controlled by a half-ball-valve 49 carried on a rocking arm 50 mounted in a diaphragm 51 separating a pair of chambers 52, 53. The chamber 53 is connected by a branch 53a to the suction side of the variable delivery pump.

The rocking arm 50 is acted upon by a spring 54 which tends to close the valve 49 and is provided with an adjustable abutment 55. The rocking arm 50 is also acted upon by a piston element 56 opposing the action of the spring, which piston element is accommodated at one end in a chamber 56a connected by a branch pipe 57 to the pipeline 42 so that the piston element is subjected to the fuel delivery pressure and exerts a load on the rocking arm 50 which is dependent upon the fuel delivery pressure. The rocking arm 50 is also acted upon by a barometric capsule 58 which is located between an adjustable abutment 59 and one end of the rocking lever 50. The barometric capsule is so arranged that it applies a load to the rocking arm opposing the action of the spring 54, which load increases with decrease of pressure to which the capsule is subjected and vice-versa. The above described fuel supply and control system is well known and the chamber 52 within which the capsule 58 is located has hitherto been permanently connected to a point on the aircraft or in the engine nacelle which point is subjected to total pressure as previously defined.

The operation of the control is as follows:

Assuming the pressure to which the capsule 58 is subjected to be constant, then as the fuel delivery pressure increases the load applied to the rocking arm 50 through the plunger 56 gradually increases tending to open the half-ball-valve 49. When the load applied by the plunger 56 is sufficiently large to overcome the spring 54, the half-ball-valve will open allowing the flow of the servo fluid through the conduit 48 into the chamber 53, thus creating a pressure drop across the piston of the piston and cylinder device 40 and reducing the stroke of the plungers 38, and in turn reducing the fuel delivery pressure. The device just described therefore acts to control the fuel delivery pressure in the pipe-line 42. Now since the load applied to the rocking arm 50 by the spring 54 is opposed both by the sum of the loads afforded by the capsule 58 and the plunger 56, the action of the capsule on decrease of the total pressure is to reduce the fuel delivery pressure, and vice-versa.

With such an hitherto known arrangement in which the capsule is subjected to total pressure it will be appreciated that at any given altitude, increase in aircraft speed will result in increase in fuel delivery pressure and thus increase in fuel delivery. If the control is set for maximum power, such increase in fuel delivery will produce an unacceptable increase in power. It should further be appreciated that even if the fuel delivery remained constant at a given altitude, being independent of forward speed, the supercharging effect of the dynamic pressure on the compressor of the engine would still produce an unacceptable power increase with maximum power setting of the control and under low-altitude high-speed flight conditions.

The present invention provides means for avoiding the possibility of such unacceptable power being delivered, and in the particular embodiment illustrated the chamber 52 within which the capsule 58 is located, is connected to the conduit 33 (Fig. 2), and is thus subjected, according to the position of the valve 30, to a pressure which decreases with increased aircraft speed or to a pressure which increases with increased aircraft speed. The position of the valve 30 is determined by altitude sensitive mechanism described below.

Thus with this arrangement and with the aircraft in flight at any given altitude assume the conduit 33 to be connected to the conduit 28 and so to the point 31 on the aircraft wing. Thus when the aircraft speed increases the pressure at the point 31 will decrease and the capsule 58 will increase its load on the rocking arm 50 and thereby reduce the fuel pressure in the pipeline 42. If therefore the control is set for maximum power the fuel delivery is decreased with increase of speed, thereby avoiding the possibility of an unacceptable power delivery arising from the supercharging of the engine compressor by dynamic pressure.

Above a certain altitude due to reduced air density it will be impossible for the engine to develop a power which is substantially in excess of the designed or bench-tested output and there is therefore provided an additional control whereby the capsule 58 can, above this altitude, be subjected to a pressure taken from the point 32, at which the static pressure increases with the increased aircraft speed. For this purpose there is provided an altitude-responsive mechanism for controlling the valve 30, so that at above a given altitude the valve 30 is operated to disconnect the conduit 33 from the conduit 28 and to connect it to the conduit 29 leading to the point 32.

This altitude-responsive mechanism comprises a barometric capsule element 60 subjected to the ambient static pressure and arranged to operate a piston valve 61 which controls the flow of a servo-fluid from a pump 62 driven from the drive take-off 27 to a servo piston and cylinder device 63 and also controls the return flow of the servo-fluid. The piston of the piston and cylinder device 63 is connected by a link 64 to the operating arm 65 of the valve 30.

As the capsule 60 expands with increase in altitude of the aircraft, the piston valve 61 will be gradually moved to the right as shown in the drawings and will at a certain altitude disconnect the pipeline 66 from the servo-fluid pressure pipe 67 and connect it to the drain-pipe 68 and will at the same time disconnect the pipeline 69 from the drainpipe 68 and connect it to the servo fluid supply pipe 67. Thus pressure fluid will be fed to the right-hand side of the piston of the piston and cylinder device 63, moving it to the left and operating the valve 30 to close off the conduit 28 from the conduit 33 and connect the conduit 33 to the conduit 29.

A relief valve 70 is provided between the servo fluid supply pipe 67 and the drain-pipe 68.

It will thus be seen that the above described fuel control arrangement of the invention provides that for each setting of the throttle 43 and for level flight below a certain altitude the fuel delivery pressure is reduced with increase of aircraft speed and that above a given altitude the fuel delivery pressure can be increased with increase of aircraft speed.

The altitude at which the change-over occurs will be so selected that the increase in the fuel delivery pressure with increase of speed of the aircraft does not result in unacceptable development of power by the engine.

As above described there is a second bleed duct 47 from the spring-loaded side of the piston of piston and cylinder device 40, and the flow through this duct is so controlled in known manner by a centrifugal governor device incorporated in the pump to limit the engine speed to a predetermined maximum. The out-flow from the bleed duct 47 is controlled by a half-ball-valve 71 of which the ball is carried by a rocking arm 72, the opposite end of which is connected to a diaphragm 73. The diaphragm 73 is connected to a helical spring 74 which is in tension and therefore tends to keep the half-ball-valve 71 closed. The rotor 37 of the pump is formed with a central bore 37a which is open to the fuel inlet 36 and from which a series of radial drillings 37b extend to the space around the rotor. The rotor thus acts as a centrifugal pump and the pressure developed by it is arranged to act on the diaphragm 73 against the tension of the spring 74. Thus when the pressure acting on the diaphragm exceeds a given value, dependent on the speed of the rotor 37 and thus of the engine rotor 21 the arm 72 will be rocked opening the valve 71 and allowing a flow from the spring-loaded side of the piston and cylinder device 40 and therefore producing a reduction in the stroke of the pump. The opposite side of the diaphragm 73 is connected to the suction side of the variable delivery pump through a port 75. The operation of this known form of control will be well understood by those familiar with the art.

It is a feature of the present preferred embodiment of the invention that such a centrifugal governor is used to control the fuel supply to avoid a maximum rotational speed being exceeded. However extreme low temperature air intake conditions such as experienced in arctic climates might result, where the maximum fuel supply is controlled by such a governor in an unacceptable power output from the engine. Additionally, therefore, the invention provides that the capsule 58, the plunger 56 and the spring 54 shall be so adjusted to load the half-ball-valve 49 that it acts at ground level and whilst the aircraft is stationary to limit the maximum fuel flow to a value appropriate to give a power output from the engine equal to the designed output or to an acceptable amount in excess of the designed output. In this way under extreme low temperature conditions, such as mentioned, the fuel supply to the engine will be limited by the maximum fuel pressure as defined by the half-ball-valve control 49 and not by the centrifugal governor arrangement controlling the half-ball-valve 71.

From the foregoing description it will be clear that the improved fuel control prevents the excessive development of power by the engine when the aircraft is in flight, due to the supercharging effect of the dynamic pressure.

It will be appreciated that alternative methods of controlling the fuel supply by means of the barometric capsule may be adopted; for example, the fuel pressure from a fixed delivery fuel pump may be relieved by a by-pass valve, the relieving pressure of which is a function of the pressure applied to the barometric capsule.

We claim:

1. An aircraft having a gas-turbine power plant, a fuel-supply control system, a pressure-sensitive device in said system controlling the fuel flow to the turbine so that increase of pressure to which the device is subjected results in increase of fuel flow and decrease of pressure in decrease of fuel flow, and a connection between said pressure-sensitive device and a point on the external surface of the aircraft at which the pressure decreases with increase of forward speed of the aircraft.

2. An aircraft having a gas-turbine power plant, a fuel-supply control system, a pressure-sensitive device in said system controlling the fuel flow to the turbine so that increase of pressure to which the device is subjected results in increase of fuel flow and decrease of pressure in decrease of fuel flow, and a plurality of connections from said device to points on the aircraft, one of such points being so located on the external surface of the aircraft that the pressure thereat decreases with increase of aircraft speed to be less than the ambient static pressure, and a second of such points being so located on the aircraft as to be subjected to ram pressure so that the pressure thereat increases with increase of aircraft speed to be in excess of ambient static pressure, and valve means for selectively connecting one of said first and second points to said device.

3. A fuel-supply control system as claimed in claim 2 further comprising a barometric element responsive to changes in ambient static pressure and connected to actuate said valve means to connect the first said point to said pressure-sensitive device when the ambient static pressure exceeds a selected value and to connect said second point to said pressure-sensitive device when the static pressure falls below a selected value.

DAVID HAVELOCK BALLANTYNE.
ALBERT JUBB.

REFERENCES CITED

The following references are of record in the file of this patent:

UNITED STATES PATENTS

| Number | Name | Date |
|---|---|---|
| 1,978,863 | Gregg et al. | Oct. 30, 1934 |
| 2,160,194 | Bates | May 30, 1939 |
| 2,191,250 | Fischel | Feb. 20, 1940 |
| 2,391,896 | Hanson | Jan. 1, 1946 |